June 25, 1935.  C. SAURER  2,006,303
FLEXIBLE CONNECTION
Filed Feb. 12, 1932
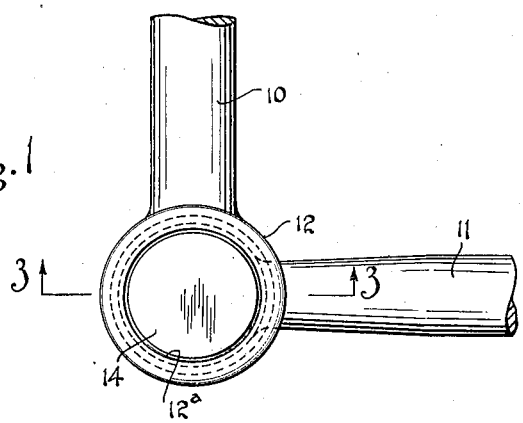
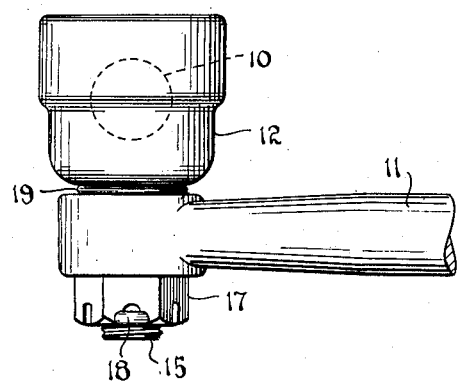
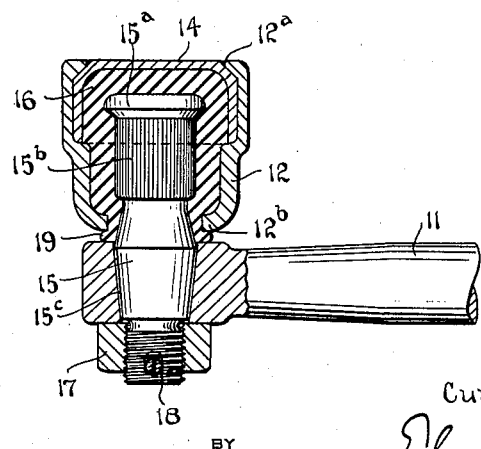
INVENTOR
Curt Saurer
BY
ATTORNEYS Patented June 25, 1935

2,006,303

UNITED STATES PATENT OFFICE 2,006,303

FLEXIBLE CONNECTION

Curt Saurer, Akron, Ohio, assignor to The Firestone Tire and Rubber Company, Akron, Ohio, a corporation of Ohio Application February 12, 1932, Serial No. 592,555

6 Claims. (Cl. 287—85)

This invention relates to flexible connections such as are provided for the joints or hinges of articulated structures.

The invention is especially useful in association with the steering mechanism of motor vehicles, which mechanism heretofore usually has comprised at least one universal joint of the ball and socket type. Such joints require lubrication, require means for taking up wear, and frequently prematurely fail because of the entrance of dirt and grit.

The chief objects of this invention are to provide a flexible connection that will function in the manner of a ball and socket joint, yet has none of the disadvantages thereof; to provide a flexible connection that is simple in construction; to provide a connection that absorbs rather than transmits vibration; and to provide a connection that yieldingly urges its associated structure toward a determinate normal position. More specific objects are to avoid the need for lubrication; to obviate the need for adjustment due to wear; and to provide a flexible connection which is not affected by dust and grit.

Of the accompanying drawing:

Figure 1 is a plan view of the improved flexible connection, in its preferred form;

Figure 2 is a side elevation thereof; and

Figure 3 is a section on the line 3—3 of Figure 1.

Referring to the drawing, 10, 11 are two rods or links constituting a part of an articulated structure, and 12 is a tubular socket or receptacle integrally formed on an end of rod 10 and constituting a part of the flexible connection by which the rods are joined. Mounted in the socket 12 is a unit comprising a cup-shaped metal structure 14, a threaded stud 15 disposed co-axially thereof, and a vulcanized rubber structure 16 that is vulcanized to the interior of the cup 14 and to a portion of the stud 15. That portion of the stud 15 that is embedded in the rubber 16 is formed with a flange or head 15ª, and with a knurled shank or shoulder 15ᵇ adjacent thereto, the arrangement providing a secure union of the stud and the rubber. The exposed portion of the stud 15 is tapered as at 15ᶜ so as firmly to engage in a complementally tapered bore in the end portion of the rod or link 11, the latter being retained on the stud by a nut 17. The nut 17 may be a castle nut that is restrained against rotation by the usual cotter pin 18.

The cup 14 has a force fit with the bore of the socket 12, and the adjacent marginal portions of the socket are swaged or upset, as shown at 12ª, Figure 3, so as to overlie the base margin of the cup, whereby relative movement of the cup and socket is prevented. The marginal portions of the socket 12 at the opposite end thereof are upset or swaged as shown at 12ᵇ, Figure 3, so as to compress the rubber 16 and cause some of it to bulge over the end of the socket as shown at 19, whereby strong frictional engagement between the rubber and the socket is secured, and the entrance of dust and grit between the rubber and the socket is prevented.

The invention provides a joint or connection that requires no lubrication, nor can grit or dirt reach its working parts. The connection has few parts, requires no adjustment, and has no parts that are subject to wear due to friction. The yielding nature of the rubber 16 permits limited axial and lateral movement of the stud 15 whereby the connection, when used with the steering mechanism of motor vehicles, absorbs road shocks and prevents their transmission to the driver through the steering column. The cup 14 and rubber 16 so strongly engage the socket 12 that relative angular movement of the links 10, 11 through substantially 90 degrees is possible without causing slippage between the socket and cup or rubber, and without tearing the rubber from the metal members to which it is vulcanized. Moreover, the rubber member of the connection when placed under tension by relative angular movement of the links 10, 11, yieldingly urges the parts back toward a determinate normal position, which feature gives the connection a decided advantage over ordinary ball and socket connections when used in motor vehicle steering systems.

Modification may be resorted to without departing from the spirit of the invention or the scope of the appended claims, which are not limited wholly to the specific construction shown and described.

What is claimed is:

1. In a flexible connection, the combination of a pair of relatively movable members, a substantially cylindrical socket on one of said members, a rubber member in said socket frictionally restrained from movement relative thereto, and a stud on the other of said members, said stud having a substantially cylindrical body and a terminal rib embedded in said rubber member and vulcanized thereto, the cylindrical body of the stud permitting substantial relative rotation of the socket with respect to the axis of said stud but permitting only a slight degree of rotation of the socket in axes at an angle to the axis of the stud, said terminal rib preventing withdrawal of the stud from said socket and rubber member, one of said relatively movable members including an arm extending approximately at right angles to the axis of said stud to provide a lever for relatively rotating said socket with respect to said stud.

2. In a flexible connection, the combination of a pair of members relatively angularly movable in parallel planes, a substantially cylindrical socket, a structure comprising rubber mounted therein under initial compression and frictionally engaging the inner surface thereof, and a stud having one end formed with a substantially cylindrical head embedded in and vulcanized to said rubber structure, the socket being adapted for attachment to one of said relatively movable members and the stud to the other of said members, the cylindrical body of the stud permitting substantial relative rotation of the socket with respect to the axis of said stud but permitting only a slight degree of rotation of the socket in axes at an angle to the axis of the stud.

3. In a flexible connection, the combination of tubular socket, a metal cup, a generally cylindrical rubber structure mounted in said cup and vulcanized thereto, and a stud in said rubber structure vulcanized thereto and projecting axially from one end thereof, said cup and rubber structure being fixedly retained in the socket, the socket and stud being adapted for connection to respective relatively movable members.

4. A combination as defined in claim 3 in which the end portions of the socket are swaged so as to confine the cup and compress the rubber structure therein.

5. In a flexible connection, the combination of a tubular socket, a generally cylindrical rubber structure, a metal cap vulcanized on one end of the latter, and a threaded stud mounted axially of the rubber structure and vulcanized therein with the threaded portion disposed exteriorly thereof, the metal cap having a force fit in the socket, and the rubber structure being mounted in the socket and compressed so as frictionally to engage the wall thereof.

6. A combination as defined in claim 5 in which one end of the socket is swaged or upset so as to confine the cup and the other end of the socket is upset so as to compress the rubber structure.

CURT SAURER.